UNITED STATES PATENT OFFICE.

NORMAN R. LEVI, OF NEW KENSINGTON, PENNSYLVANIA.

ROACH-EXTERMINATOR.

1,022,096.　　　Specification of Letters Patent.　　Patented Apr. 2, 1912.

No Drawing.　　Application filed September 19, 1911. Serial No. 650,210.

*To all whom it may concern:*

Be it known that I, NORMAN ROBERT LEVI, a resident of New Kensington, in the county of Allegheny and State of Pennsylvania, have invented a new and useful Improvement in Roach-Exterminators, of which the following is a specification.

This invention relates to an insecticide for the destruction of roaches, bed bugs and other house insects and vermin.

The object is to provide a liquid insecticide which can be readily applied by spraying or brushing on woodwork of dwellings, furniture and other places in which vermin of the character described hide, and which can be made at a low cost and is highly efficient for its intended purpose.

The insecticide is composed of the following ingredients and preferably in the proportions stated: Strychnin ⅛ ounce, sal-soda 6 ounces, water ½ pint, turpentine ½ pint, kerosene 1 pint, bicarbonate of soda ½ ounce.

In compounding the liquid, the strychnin and sal-soda are dissolved in the water, the water being stirred or shaken for this purpose. The kerosene and turpentine are then added, it being immaterial which is added first, or whether the kerosene and turpentine are mixed before adding to the poisonous solution. Finally the bicarbonate of soda is added and the whole vigorously stirred or shaken in order to form an intimate mixture of the several ingredients and bring the heavier ingredients, such as the water and turpentine, in suspension in the lighter ingredient, the kerosene. In this composition, the water serves as a solvent for the strychnin and sal-soda which are the active ingredients in the destruction of the vermin. The bicarbonate of soda causes the water, turpentine and kerosene to remain in intimate permanent mixture instead of separating by gravity as they otherwise would do. The turpentine and kerosene are of a nature to be absorbed by wood and consequently carry the poison into the crevices and cracks in which vermin usually take refuge.

In the use of the insecticide it is either sprayed or applied with a brush on the crevices and cracks of the woodwork of dwellings or of furniture or other places infested with vermin. The composition is highly effective and on account of its capacity of penetrating into wood and crevices and cracks of wood will reach deeply concealed vermin.

The proportion of the ingredients can be varied somewhat from those above stated. Particularly is it possible to increase the proportion of turpentine as it is largely absorbed in the wood.

What I claim is:

1. An insecticide comprising kerosene, turpentine, bicarbonate of soda and a poisonous aqueous solution.

2. An insecticide comprising water, kerosene, turpentine, bicarbonate of soda, strychnin and sal-soda.

3. An insecticide comprising turpentine one-half pint, kerosene one pint, bicarbonate of soda one-half ounce and a poisonous aqueous solution.

4. An insecticide comprising strychnin, sal-soda, water, turpentine, kerosene and bicarbonate of soda.

5. An insecticide comprising strychnin one-eighth ounce, sal-soda six ounces, bicarbonate of soda one-half ounce, turpentine one-half pint, kerosene one pint and water one-half pint.

In testimony whereof, I have hereunto set my hand.

NORMAN R. LEVI.

Witnesses:
F. W. WINTER,
MARY E. CAHOON.